W. C. GAYTON.
Window-Cleaner.

No. 8,393 Reissued Sept. 3, 1878.

Attest:
W. T. Baker.
N. Durbrow Jr.

INVENTOR
William C. Gayton,
By P. C. Dyrenforth,
Attorney.

N. PETERS, PHOTO-LITHOGRAPHER, WASHINGTON, D. C.

UNITED STATES PATENT OFFICE.

WILLIAM C. GAYTON, OF CHICAGO, ILLINOIS.

IMPROVEMENT IN WINDOW-CLEANERS.

Specification forming part of Letters Patent No. 196,006, dated October 9, 1877; Reissue No. 8,393, dated September 3, 1878; application filed August 5, 1878.

*To all whom it may concern:*

Be it known that I, WILLIAM C. GAYTON, of the city of Chicago, in the county of Cook and State of Illinois, have invented a new and Improved Device for Cleaning Windows; and I hereby declare the following to be a full, clear, and exact description thereof, reference being had to the accompanying drawings, of which—

Figure 1:
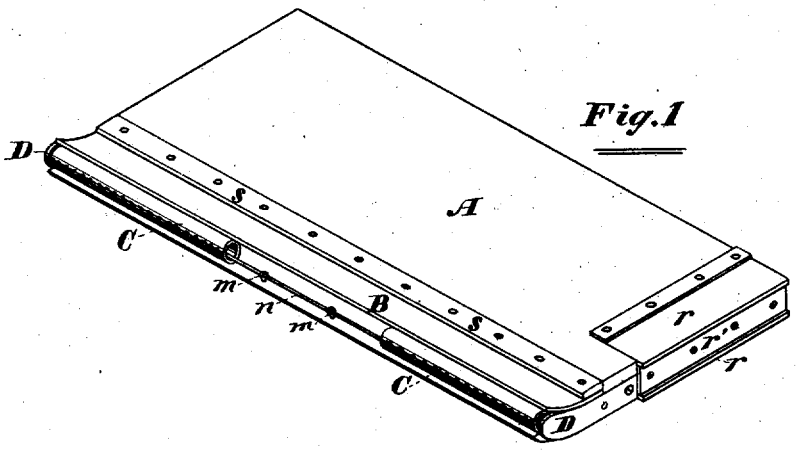
Figure 2:
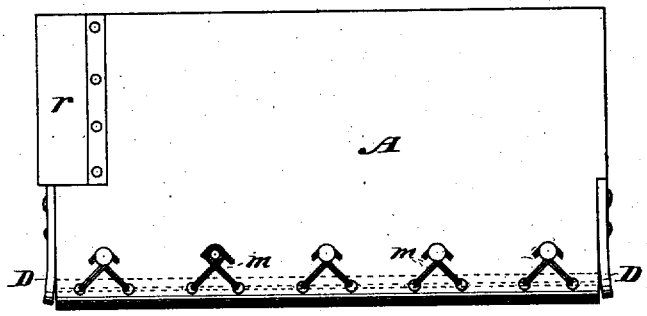
Figure 3:
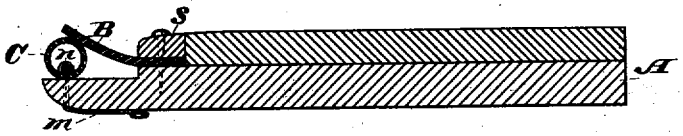

Figure 1 is a perspective view with a portion of the tubular cushion removed; Fig. 2, a plan view of the back; and Fig. 3, a cross-section.

My invention relates to a device for drying and cleaning window-panes, mirrors, and like smooth surfaces after they have been washed in the usual manner; and it consists, first, in employing upon a suitable holder an elastic strip, attached at one edge to the holder, and thence projecting forward and outward, and sustained or stayed by means of a bearing or support beneath it—that is to say, as between it and the holder—at or near its opposite edge; secondly, in having the support of a yielding character, whereby uniformity of contact between the rubber strip and the glass is insured; thirdly, in making the bearing tubular in form and of india-rubber, whereby it best answers the purpose for which it is designed; and, fourthly, in combining with the rubber strip and holder two thick rubber plates, fastened one to each end of the holder behind the rubber strip, to form a backing for the same, and adapt it to enter the corners of the sash, all as hereinafter more fully set forth.

In the drawings, A is the wooden holder, which may be of any suitable form, and may be provided with a handle adapted to any particular mode of application.

On the face and ends of the holder I form a rabbet, extending from the outer edge for a sufficient distance backward to receive the entire rubber device. At the rear of this rabbet the edge of the elastic strip is secured to the holder, preferably by means of a strip, *s*, as shown.

The elastic strip B extends forward in an inclined direction from where it is fastened to the holder, and rests along its outer margin against a bearing or support, C, upon the holder, at or near the outer edge of the same.

It is obvious that, so far as this support performs only the essential function of staying the outer margin of the strip B, it may be constructed of any form and any material; but I find it preferable to have it yielding and elastic, whereby the edge of the strip B is enabled to conform the more closely and uniformly to the surface of the glass, and I therefore construct it of india-rubber. The cushion or bearing answers its purpose best, moreover, when made of tubular form, as shown in the drawings, and this is the one, therefore, which I commonly adopt.

The tubular cushion may be attached to the holder by any convenient means which will serve to hold it firmly. The drawing shows it secured by wires *m*, fastened to the back of the holder and passing through holes into the tube upon the opposite side, where they loop over a thicker wire, *n*, passing lengthwise through the tube.

D D are the rubber end pieces, fastened to the holder at its ends, for the purpose, as before stated, of affording a backing to the flexible strip B where it enters the corners of the sash.

I sometimes add a separate device for the corners, to be employed when deemed necessary, consisting of three strips of rubber, *r r r'*, fastened to the holder, one on each side, and the third at the end, in the manner and position shown.

The mode of applying my window-cleaner is as follows: The pane having been washed, the edge of the elastic strip is pressed against it and drawn across from top to bottom, or from side to side, a single application to any one part being all that is necessary. This not only removes the moisture from the glass, but leaves it clearer and brighter than several minutes rubbing with a cloth would serve to render it.

What I claim as new, and desire to secure by Letters Patent, is—

1. An improved window-cleaner consisting of a handle or holder, an elastic rubbing-strip attached by one edge to said holder, and a bearing or support for said strip near its outer edge, said parts being combined substantially as described.

2. The holder having its back extended and lying underneath the projecting strip, jointly with the bearing or support located thereon, and the rubbing-strip, substantially as described.

3. The combination, with the holder, of the elastic rubbing-strip and a yielding bearing or cushion, substantially as and for the purpose set forth.

4. In combination with the elastic strip B, attached to a suitable holder, the bearing or cushion C, of india-rubber, made tubular in form, substantially as described, and for the purpose set forth.

5. The combination, with the holder having an extended back, and with the rubber strip and the bearing or support, of the end pieces D, as and for the purpose specified.

WILLIAM C. GAYTON.

In presence of—
H. E. WOOKEY,
E. F. MERRILL.